United States Patent
Tsuchida

(10) Patent No.: US 10,081,721 B2
(45) Date of Patent: Sep. 25, 2018

(54) AQUEOUS SILANE COUPLING AGENT COMPOSITION, MAKING METHOD, AND SURFACE TREATING AGENT

(71) Applicant: Shin-Etsu Chemical Co., Ltd., Tokyo (JP)

(72) Inventor: Kazuhiro Tsuchida, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 529 days.

(21) Appl. No.: 14/829,825

(22) Filed: Aug. 19, 2015

(65) Prior Publication Data

US 2016/0060433 A1   Mar. 3, 2016

(30) Foreign Application Priority Data

Aug. 26, 2014   (JP) ................. 2014-171359

(51) Int. Cl.
| | | |
|---|---|---|
| *C09C 3/12* | (2006.01) | |
| *C08K 5/5419* | (2006.01) | |
| *C09D 183/08* | (2006.01) | |
| *C08G 77/14* | (2006.01) | |
| *C08G 77/28* | (2006.01) | |
| *C03C 25/40* | (2006.01) | |
| *C08K 5/548* | (2006.01) | |
| *C09D 4/00* | (2006.01) | |

(52) U.S. Cl.
CPC ............ *C08K 5/5419* (2013.01); *C03C 25/40* (2013.01); *C08G 77/14* (2013.01); *C08G 77/28* (2013.01); *C08K 5/548* (2013.01); *C09C 3/12* (2013.01); *C09D 183/08* (2013.01); *C09D 4/00* (2013.01)

(58) Field of Classification Search
USPC ................. 442/180; 406/181; 252/182.3
See application file for complete search history.

(56) References Cited

FOREIGN PATENT DOCUMENTS

| | | | |
|---|---|---|---|
| JP | 8-302320 | A | 11/1996 |
| JP | 2006-22158 | A | 1/2006 |
| JP | 2009-524709 | A | 7/2009 |
| JP | 2012-46576 | A | 3/2012 |
| WO | WO 2007/085320 | A2 | 8/2007 |
| WO | WO 2015/041339 | A1 | 3/2015 |
| WO | WO 2015/041432 | A1 | 3/2015 |

OTHER PUBLICATIONS

Extended European Search Report dated Nov. 27, 2015, in European Patent Application No. 15180704.7.

*Primary Examiner* — Lynda Salvatore
(74) *Attorney, Agent, or Firm* — Birch, Stewart, Kolasch & Birch, LLP

(57) ABSTRACT

An aqueous silane coupling agent composition is obtained from cohydrolytic reaction of (i) a succinic anhydride-containing silane coupling agent and (ii) a mercapto-containing silane coupling agent in a molar ratio of 99:1 to 1:1. The composition has improved storage stability under high-temperature conditions and is effective as modifier.

11 Claims, No Drawings

AQUEOUS SILANE COUPLING AGENT COMPOSITION, MAKING METHOD, AND SURFACE TREATING AGENT

CROSS-REFERENCE TO RELATED APPLICATION

This non-provisional application claims priority under 35 U.S.C. § 119(a) on Patent Application No. 2014-171359 filed in Japan on Aug. 26, 2014, the entire contents of which are hereby incorporated by reference.

TECHNICAL FIELD

This invention relates to an aqueous silane coupling agent composition obtained from cohydrolytic reaction of a succinic anhydride-containing silane coupling agent and a mercapto-containing silane coupling agent, a method of preparing the same, a surface treating agent, and an article treated therewith.

BACKGROUND ART

Organosilicon compounds having a hydrolyzable silyl group and an organic reactive group are generally known as silane coupling agents and often used as adhesives, paint additives and resin modifiers, for example, since they are capable of forming bonds between inorganic materials and organic materials. The problem associated with the use of a silane coupling agent in hydrolyzate form is that it contains a high proportion of a volatile organic solvent which is added as the stabilizer/diluent for an alcohol and silanol resulting from hydrolysis of hydrolyzable silyl groups as typified by alkoxysilyl groups.

In general, silane sol-gel coating materials having a certain level of storage stability may be prepared using partial hydrolyzates of alkoxysilanes and acid-based hydrolytic catalysts. However, these coating materials are limited to alcohol and organic solvent based systems. If the system uses a sufficient amount of water to complete hydrolysis of alkoxysilanes and has a high solid content, then the system undergoes a substantial loss of storage stability and becomes difficult to control hydrolytic condensation of alkoxysilanes in the course of coating material preparation, leading to a molecular weight buildup or gelation.

JP-A 2009-524709 discloses a water-dilutable sol-gel composition essentially comprising glycidyloxypropylalkoxysilane, aqueous silica sol, organic acid, and organometallic compound of titanium or zirconium, which serves as a low alcohol content, aqueous siloxane coating material. With respect to the applications of this composition, only corrosion control coats and primer coats are referred to while its effectiveness is demonstrated nowhere. This coating material leaves a concern that organic acids may remain as the volatile organic compound.

Typical organic reactive groups on silane coupling agents include vinyl, amino, epoxy, (meth)acrylic, mercapto, isocyanate, ketimine structure, and styryl groups. Silane coupling agents having such groups are well known and used in a variety of applications.

Among others, silane coupling agents having an amino group contributing to water solubility have not only a high water solubility, but also a high aqueous solution stability so that an alcohol-free aqueous silane solution may be prepared by removing the alcohol resulting from hydrolysis. They are expected as less environmental load material.

JP-A 2012-046576 discloses that a silanol type silane coupling agent having a dicarboxylic acid structure which is obtained from hydrolysis of an acid anhydride-containing silane coupling agent is useful as modifier for encapsulant epoxy resins. No reference is made to the alcohol generated from the coupling agent. This technology falls in the range that silane coupling agents are used in hydrolytic aqueous solution form.

On the other hand, mercapto-containing silane coupling agents are believed effective for adhesion to metal substrates. An aqueous solution of the mercapto-containing silane coupling agent can be prepared as long as the concentration of the agent is as low as 0.1 to 5% by weight, and a water-miscible organic solvent (or volatile organic compound) such as methanol is co-present. However, preparation of an aqueous solution of the agent to a high concentration and reduction of the alcohol generated are inhibited by the high hydrophobicity of mercapto groups.

As discussed above, silane coupling agents having hydrophilic groups such as amino and carboxylic acid groups can form aqueous solutions having high stability whereas silane coupling agents having other organic functional groups, especially mercapto are difficult to form aqueous solutions with high concentration. Those materials from which volatile organic compounds such as alcohols have been removed and which do not generate volatile organic compounds on practical use are desired in the related field since they are environment friendly.

CITATION LIST

Patent Document 1: JP-A 2009-524709 (WO 2007/085320)
Patent Document 2: JP-A 2012-046576
Patent Document 3: JP-A H08-302320
Patent Document 4: JP-A 2006-022158

DISCLOSURE OF INVENTION

An object of the invention is to provide an aqueous silane coupling agent composition which has improved storage stability under high-temperature conditions and is promising as modifier, and a method of preparing the composition. Another object is to provide a surface treating agent comprising the composition and an article treated therewith.

The inventor has found that an aqueous silane coupling agent composition is obtained from cohydrolytic reaction of (i) a succinic anhydride-containing silane coupling agent and (ii) a mercapto-containing silane coupling agent in a molar ratio of 99:1 to 1:1, specifically by effecting cohydrolytic reaction of silane coupling agents (i) and (ii) and removing the alcohol generated such that the content of volatile organic compounds is up to 10% by weight of volatile components in the composition which are detectable by headspace gas chromatography, and that the resulting composition has improved storage stability under high-temperature conditions and is promising as modifier.

In a first aspect, the invention provides an aqueous silane coupling agent composition obtained from cohydrolytic reaction of (i) a succinic anhydride-containing silane coupling agent having the general formula (1) and (ii) a mercapto-containing silane coupling agent having the general formula (2) in a molar ratio of 99:1 to 1:1.

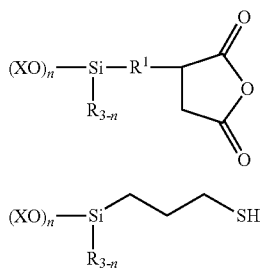

Herein $R^1$ is a substituted or unsubstituted, saturated, divalent hydrocarbon group of 3 to 12 carbon atoms or substituted or unsubstituted, divalent hydrocarbon group of 3 to 12 carbon atoms having an unsaturated carbon-carbon double bond or triple bond, with the proviso that when $R^1$ is branched, an aliphatic unsaturated carbon-carbon bond is not present at an end of the branch, and when $R^1$ is a substituted group, an aliphatic unsaturated carbon-carbon bond is not present at an end of the substituent; R is a monovalent hydrocarbon group of 1 to 10 carbon atoms; n is 2 or 3; and X is a monovalent hydrocarbon group of 1 to 4 carbon atoms. Typically, $R^1$ is propylene.

Preferably, the aqueous silane coupling agent composition contains volatile components which are detectable by headspace gas chromatography, the content of volatile organic compounds being up to 10% by weight of the volatile components.

Preferably, hydrolyzates and (co)condensates thereof are obtained from the cohydrolytic reaction of silane coupling agents (i) and (ii) and present in a total amount of 0.5 to 50% by weight of the entire composition.

Preferably, the aqueous silane coupling agent composition experiences a viscosity buildup of less than 10% when stored at 50° C. for one month.

In a second aspect, the invention provides a method for preparing the aqueous silane coupling agent composition defined above, comprising the steps of effecting cohydrolytic reaction of (i) a succinic anhydride-containing silane coupling agent having the general formula (1) and (ii) a mercapto-containing silane coupling agent having the general formula (2) in a molar ratio of 99:1 to 1:1, and removing the alcohol generated such that the content of volatile organic compounds is up to 10% by weight of volatile components in the composition which are detectable by headspace gas chromatography.

In a third aspect, the invention provides a surface treating agent comprising the aqueous silane coupling agent composition defined above.

In a fourth aspect, the invention provides an article comprising a substrate treated with the surface treating agent defined above.

The substrate is typically a glass fiber member selected from among glass cloth, glass tape, glass mat and glass paper, or an inorganic filler, or ceramic or metal.

Advantageous Effects of Invention

Since a silane coupling agent having a mercapto group and featuring low water solubility and low stability in aqueous solution form is co-hydrolyzed with a silane coupling agent having a succinic anhydride group, there is obtained an aqueous silane coupling agent composition which exhibits high water solubility and remains stable even in high concentrations. Since the silane coupling agent composition is characterized by substantial completion of hydrolysis, the reactivity of silyl group with inorganic materials is high, and the hydrolysis step that prior art silane coupling agents undergo during use is omitted. This ensures high productivity on actual use. Since volatile organic compounds are removed following the hydrolytic reaction, substantially no volatile organic compounds are contained or released, and thus the composition poses minimal burdens to the workers and the working environment. Resins modified with the inventive surface treating agent are tightly bondable to various inorganic materials including glass.

DESCRIPTION OF PREFERRED EMBODIMENTS

The invention provides an aqueous silane coupling agent composition obtained from cohydrolytic reaction of (i) a succinic anhydride-containing silane coupling agent having the general formula (1) and (ii) a mercapto-containing silane coupling agent having the general formula (2) in a molar ratio (i):(ii) of 99:1 to 1:1.

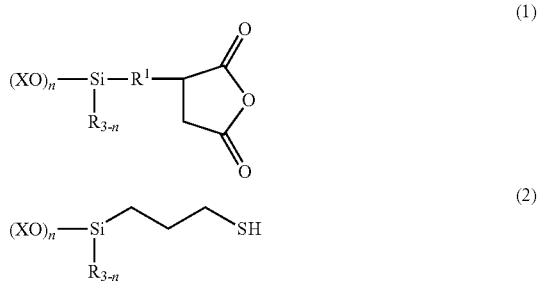

Herein $R^1$ is a substituted or unsubstituted, saturated, divalent hydrocarbon group of 3 to 12 carbon atoms or substituted or unsubstituted, divalent hydrocarbon group of 3 to 12 carbon atoms having an unsaturated carbon-carbon double bond or triple bond, with the proviso that when $R^1$ is branched, an aliphatic unsaturated carbon-carbon bond is not present at an end of the branch, and when $R^1$ is a substituted group, an aliphatic unsaturated carbon-carbon bond is not present at an end of the substituent; R is a monovalent hydrocarbon group of 1 to 10 carbon atoms; n is 2 or 3; and X is a monovalent hydrocarbon group of 1 to 4 carbon atoms.

In formula (1), $R^1$ is a substituted or unsubstituted, saturated, divalent hydrocarbon group of 3 to 12 carbon atoms, preferably 3 to 8 carbon atoms or a substituted or unsubstituted, divalent hydrocarbon group of 3 to 12 carbon atoms, preferably 3 to 8 carbon atoms having an unsaturated carbon-carbon double bond or triple bond, with the proviso that when $R^1$ is branched, an aliphatic unsaturated carbon-carbon bond is not present at an end of the branch, and when $R^1$ is a substituted group, an aliphatic unsaturated carbon-carbon bond is not present at an end of the substituent. Suitable substituted or unsubstituted, saturated, divalent hydrocarbon groups include unsubstituted, saturated, divalent hydrocarbon groups, for example, alkylene groups such as propylene, isopropylene, butylene, isobutylene, tert-butylene, pentylene, neopentylene, hexylene, and octylene, and cycloalkylene groups such as cyclohexylene; substituted, saturated divalent hydrocarbon groups, for example, the foregoing groups in which one or more hydrogen atoms are substituted by halogen atoms or the like. Suitable substituted or unsubstituted, divalent hydrocarbon groups having an unsaturated carbon-carbon double bond or triple bond include unsubstituted, divalent hydrocarbon groups, for example, alkenylene groups such as propenylene, butenylene, and hexenylene, alkynylene groups such as propynylene, butynylene, and octynylene, and substituted, divalent hydrocarbon groups, typically halo-substituted groups. Inter alia, $R^1$ is most preferably propylene.

In formulae (1) and (2), R is a monovalent hydrocarbon group of 1 to 10 carbon atoms, preferably 1 to 6 carbon atoms. Examples include alkyl groups such as methyl, ethyl, propyl, isopropyl, butyl, isobutyl, tert-butyl, pentyl, neopentyl, hexyl, and octyl, cycloalkyl groups such as cyclohexyl, alkenyl groups such as vinyl, allyl, and propenyl, aryl groups such as phenyl, tolyl, xylyl, and naphthyl, and aralkyl groups such as benzyl, phenylethyl and phenylpropyl. Inter alia, methyl, ethyl and phenyl are preferred.

The subscript n is 2 or 3. The silane coupling agent of formula (1) wherein n=1 is inadequate because it generates less silanol upon hydrolysis and thus exhibits low water solubility, insufficient stability in aqueous solution, and low reactivity to inorganic materials.

X is a monovalent hydrocarbon group of 1 to 4 carbon atoms. Examples include alkyl groups such as methyl, ethyl, propyl, isopropyl, butyl, isobutyl and tert-butyl, with methyl and ethyl being preferred.

Examples of the succinic anhydride-containing silane coupling agent having formula (1) include, but are not limited to, trimethoxysilylpropylsuccinic anhydride, triethoxysilylpropylsuccinic anhydride, methyldimethoxysilylpropylsuccinic anhydride, and methyldiethoxysilylpropylsuccinic anhydride.

Examples of the mercapto-containing silane coupling agent having formula (2) include, but are not limited to, trimethoxysilylpropylmercaptan, triethoxysilylpropylmercaptan, methyldimethoxysilylpropylmercaptan, and methyldiethoxysilylpropylmercaptan.

The aqueous silane coupling agent composition contains water. Preferably the content of solids, that is, the total amount of hydrolyzates and (co)condensates thereof of silane coupling agents (i) and (ii) is 0.5 to 50% by weight based on the entire composition. Specifically, the amount (g) of solids remaining when the composition is heated and dried, divided by the total amount (g) of the initial composition should range from 0.005 to 0.5. The aqueous silane coupling agent composition should preferably have a solid content of 20 to 50% by weight, and more preferably 30 to 50% by weight based on the entire composition. If the solid content is less than 0.5% by weight, the composition forms a film which may not exhibit sufficient water resistance and primer effect. If the solid content exceeds 50% by weight, the composition may be difficult to prepare due to a substantial decline of stability.

The aqueous silane coupling agent composition contains volatile components which are detectable by headspace gas chromatography. The content of volatile organic compounds should preferably be up to 10% by weight, more preferably up to 5% by weight, even more preferably up to 1% by weight of the volatile components, and most preferably substantially nil (i.e., up to 0.1% by weight). If the content of volatile organic compounds exceeds 10% by weight, the composition may pose substantial burdens to the workers and the surrounding environment and fail to attain the objects of the invention.

As used herein, the "volatile organic compounds" mainly refer to alcohols resulting from hydrolysis of alkoxysilyl groups on the silane coupling agents. Also, water-miscible organic solvents such as alcohols which are intentionally added as a stabilizer to a silane coupling agent aqueous solution, as alluded to previously, and organic acids and inorganic acids (e.g., hydrochloric acid and sulfuric acid) which are used as hydrolytic catalyst for silanes are included in the "volatile organic compounds."

Also, the aqueous silane coupling agent composition should preferably have a viscosity of 5 to 100 mm$^2$/s, more preferably 7 to 80 mm$^2$/s at 25° C. The composition should preferably experience a viscosity buildup of less than 10%, more preferably less than 5% when stored at 50° C. for one month (i.e., 30 days). A viscosity buildup of 10% or more during 50° C./one-month storage indicates potential gelation with the lapse of time. Notably, the viscosity is a kinematic viscosity measured at 25° C. by an Ostwald viscometer.

The aqueous silane coupling agent composition is preferably prepared by effecting cohydrolytic reaction of (i) a succinic anhydride-containing silane coupling agent having formula (1) and (ii) a mercapto-containing silane coupling agent having formula (2) in a specific molar ratio, and removing the alcohol generated.

The molar ratio of succinic anhydride-containing silane coupling agent (i) to mercapto-containing silane coupling agent (ii) is 99:1 to 1:1, preferably 90:1 to 2:1, and more preferably 80:1 to 3:1. Outside the range, an excess proportion of agent (i) indicates less mercapto groups and leads to shortage of adhesion whereas a less proportion of agent (i) fails to impart stability to aqueous solution.

In the hydrolytic reaction, water is preferably used in an amount of 10 to 100 moles, more preferably 30 to 60 moles per mole of reactants, silane coupling agents (i) and (ii) combined.

On hydrolysis of silane coupling agents (i) and (ii), no hydrolytic catalysts known in the art are used. On use of such a catalyst, it may be left at the end of alcohol removal step subsequent to hydrolysis. The composition containing residual catalyst is undesirable from the aspect of environmental load because the catalyst can be a volatile organic compound.

Preferred hydrolysis conditions include a temperature of 30 to 110° C., more preferably 80 to 100° C. and a time of 0.5 to 24 hours, more preferably 1 to 3 hours. Outside the range, a higher temperature may cause gelation whereas hydrolysis may not fully take place at a lower temperature.

As a result of hydrolytic reaction, there may form hydrolyzates of silane coupling agents (i) and (ii) and individual condensates thereof and co-condensates thereof.

The step of removing the generated alcohol after the hydrolytic reaction may be conducted, for example, by atmospheric distillation and vacuum distillation. The distillation step may be conducted subsequently to or concurrently with the hydrolytic reaction step. From the standpoint of production efficiency, the distillation step concurrent with the hydrolytic reaction step is preferred.

Suitable alcohol removal conditions include a temperature of 30 to 110° C. and a reduced pressure of 60 hPa to atmospheric pressure, preferably 80 to 100° C. and 100 hPa to atmospheric pressure, but are not limited thereto as long as the stability of the resulting composition is not adversely affected. If the reaction temperature exceeds 110° C., the composition may become difficult to prepare because of a substantial loss of stability. A reaction temperature of lower than 30° C. may be less effective for alcohol removal, and so production efficiency is reduced.

The step of removing the alcohol generated upon hydrolysis ensures that the content of volatile organic compounds (typically alcohol) is up to 10% by weight of volatile components in the composition which are detectable by headspace gas chromatography.

Subsequent to the alcohol removal step, the aqueous silane coupling agent composition is preferably adjusted with water such that the total amount of hydrolyzates and (co)condensates thereof of silane coupling agents (i) and (ii) may be in a range of 0.5 to 50%, especially 25 to 35% by weight based on the entire composition. A composition having too high a solid content is liable to gel.

It is not always true that a stable aqueous silane coupling agent composition is obtained from cohydrolysis of a mercapto-containing silane coupling agent having low water solubility and a silane coupling agent having a hydrophilic structure group such as an aminosilane or epoxysilane. In the practice of the invention, the dicarboxylic acid structure created by hydrolysis becomes a key skeleton in obtaining the desired aqueous silane coupling agent composition because it contributes to the development of high water solubility and liquid stabilizing effect.

Since the main component has a silanol-containing structure as alluded to previously, the aqueous silane coupling agent composition functions by itself as a surface treating agent, for example, a primer or a modifier for composites of inorganic material and organic resin.

Besides the aqueous silane coupling agent composition, additives such as surfactants, preservatives, discoloration preventive agents and antioxidants may be blended in the surface treating agent as long as the objects of the invention are not impaired.

The surface treating agent is used for surface treatment of substrates, while the substrates may be made of inorganic materials which form bonds by reacting with hydrolyzable silyl groups and organic materials such as organic resins which form bonds by reacting with carboxylic acid groups. The shape of substrates is not particularly limited. Typical inorganic materials include inorganic fillers of silicon, titanium, zirconium, magnesium, aluminum, indium, tin, and single, double or complex oxides thereof, fiber glass members such as glass fibers, glass cloth, glass tape, glass mat, and glass paper, ceramics, and metal substrates such as iron, aluminum, copper, silver, gold and magnesium. Typical organic materials include epoxy resins, phenolic resins, polyimide resins, unsaturated polyester resins, paper boards, wood, solid wood boards, laminated wood boards, and chip boards. The substrate is not limited to the materials illustrated herein.

In the surface treatment of a substrate with the surface treating agent, the treatment mode and curing conditions are not particularly limited. For example, the surface treating agent may be directly applied to the substrate by flow coating, dipping or spin coating. Also applicable is a kneading treatment wherein the surface treating agent is added to and mixed with a compound composed of an untreated inorganic filler and a resin as dispersing medium.

Typical curing conditions include heating and drying. Preferably, the surface treatment is followed by heating and drying at 60 to 180° C., more preferably 80 to 150° C. for 5 minutes to 2 hours, for thereby removing the solvent and inducing chemical reaction between the main component of the surface treating agent, which consists of hydrolyzates and (co)condensates of the silane coupling agents (i) and (ii), and the substrate surface.

Due to inclusion of mercapto groups, the aqueous silane coupling agent composition exhibits high reactivity and interaction with metal materials or metal ions. The composition is thus best suited as an additive to corrosion-preventive coating compositions among other surface treating agents.

EXAMPLE

Examples and Comparative Examples are given below for illustrating the invention, but the invention is not limited thereto. In Examples, all parts are by weight; viscosity is measured at 25° C. according to JIS Z 8803, specific gravity measured at 25° C. according to JIS Z 8804, and refractive index measured at 25° C. according to JIS K 0062.

An alcohol content was measured by using a headspace autosampler TurboMatrix HS40 (Perkin Elmer Inc.), charging a vial having a volume of 20 mL with 1 g of a sample, sealing the vial with a septum, holding the sample at 60° C. for 10 minutes until gas-liquid equilibrium was reached, and collecting the gas component.

GC system: HP7820A by Agilent Technologies
Detector: thermal conductivity detector (TCD)
Column: HP Innowax 19091N-033
  (length 30 m×inner diameter 0.25 mm×film thickness 0.15 μm)
Column temperature: 40° C. (1.5 min holding)→15° C./min→80° C. (4 min holding),
  total measurement time 8.2 min
Injector temperature: 250° C.
Detector temperature: 250° C.
Carrier gas: He
Carrier gas flow rate: 1.4 mL/min Preparation of Aqueous Silane Coupling Agent Composition Example 1

A 1-L separable flask equipped with a stirrer, reflux condenser, dropping funnel and thermometer was charged with 196.7 parts (0.75 mol) of (trimethoxysilyl)propylsuccinic anhydride (X-12-967C by Shin-Etsu Chemical Co., Ltd.) and 49 parts (0.25 mol) of trimethoxysilylpropylmercaptan (KBM-803 by Shin-Etsu Chemical Co., Ltd.), to which 1,000 parts of deionized water was admitted. The contents were stirred and heated. Methanol formed by reaction and water were distilled off under atmospheric pressure until an internal temperature of about 100° C. was reached. It was confirmed that the fraction distilled off at the time when the internal temperature of 100° C. was reached consisted solely of water, not containing methanol, after which the step of atmospheric heat distillation was interrupted. The total amount of distillates at this point was 500 parts. Deionized water was added to the reaction product to form an aqueous silane coupling agent composition having a solid content of 30 wt %, which was a pale brown clear liquid having a viscosity of 7.6 mm$^2$/s, a specific gravity of 1.09, a refractive index of 1.371, pH 2.1, and a methanol content of less than 0.1 wt.

Example 2

A reaction product was prepared as in Example 1 except that an equimolar amount of (methyldimethoxysilyl)propylsuccinic anhydride was used instead of (trimethoxysilyl)propylsuccinic anhydride. Deionized water was added to the reaction product to form an aqueous silane coupling agent composition having a solid content of 30 wt %, which was a pale yellow clear liquid having a viscosity of 10.4 mm$^2$/s, a specific gravity of 1.06, a refractive index of 1.374, pH 1.9, and a methanol content of less than 0.1 wt %.

Comparative Example 1

Agent (ii) Molar Ratio 60 Mol %

A 1-L separable flask equipped with a stirrer, reflux condenser, dropping funnel and thermometer was charged with 104.9 parts (0.4 mol) of (trimethoxysilyl)propylsuccinic anhydride (X-12-967C) and 117.6 parts (0.6 mol) of trimethoxysilylpropylmercaptan (KBM-803), to which 1,000 parts of deionized water was admitted. The contents were stirred and heated. Methanol formed by reaction and water were distilled off under atmospheric pressure until an internal temperature of about 100° C. was reached. It was confirmed that the fraction distilled off at the time when the internal temperature of 100° C. was reached consisted solely of water, not containing methanol, after which the step of atmospheric heat distillation was interrupted. The total amount of distillates at this point was 500 parts. Deionized water was added to the reaction product to form an aqueous silane coupling agent composition having a solid content of 30 wt %, which was a pale brown clear liquid having a viscosity of 30.1 mm$^2$/s, a specific gravity of 1.09, a refractive index of 1.412, pH 2.4, and a methanol content of less than 0.1 wt %.

Comparative Example 2

Agent (ii) Molar Ratio 80 Mol %

A 1-L separable flask equipped with a stirrer, reflux condenser, dropping funnel and thermometer was charged with 52.5 parts (0.2 mol) of (trimethoxysilyl)propylsuccinic anhydride (X-12-967C) and 156.8 parts (0.8 mol) of trimethoxysilylpropylmercaptan (KBM-803), to which 1,000 parts of deionized water was admitted. The contents were stirred and heated. Reaction was continued until an internal temperature of about 100° C. was reached. A water-insoluble component resulting from condensation of silane components precipitated and settled down, and the reaction mixture eventually became gel, failing to obtain the desired aqueous silane coupling agent composition.

Evaluation of Stability of Aqueous Silane Coupling Agent Compositions

Examples 1 and 2 and Comparative Example 1

The compositions of Examples 1 and 2 and the composition of Comparative Example 1, in sealed state, were stored in a thermostat chamber at 50° C. Table 1 shows a percent buildup of viscosity from the initial viscosity with passage of time.

TABLE 1

| | Viscosity buildup (%) during 50° C. storage | | |
|---|---|---|---|
| | After 10 days | After 30 days | After 60 days |
| Example 1 | 1.0 | 1.0 | 1.1 |
| Example 2 | 1.0 | 1.0 | 1.1 |
| Comparative Example 1 | 30.5 | gelled | — |

As seen from the results of Examples and Comparative Example, aqueous silane coupling agent compositions of the invention maintain satisfactory stability even at a high temperature of 50° C.

Evaluation of Adhesion Between Glass Fibers and Epoxy Resin

Examples 3 and 4 and Comparative Examples 3 to 5

The reaction product obtained above, (trimethoxysilyl)propylsuccinic anhydride, or trimethoxysilylpropylmercaptan was diluted with water to form a 1 wt % dilution, which was used as surface treating agent. Glass filaments having a diameter of 20 μm were treated with the agent and dried at 100° C. for 30 minutes, yielding surface treated glass filaments. Onto the surface treated glass filaments, a heat curable composition consisting of an epoxy resin (JER828 by Japan Epoxy Resin Co., Ltd.) and a curing agent (triethylene tetramine) was applied as droplets having a diameter of several tens to several hundreds of microns such that the droplets might not contact with each other, and heat cured (specifically heated at 80° C. for 1.5 hours and at 100° C. for further 2 hours) to form a spherical resin bead. The shear strength between surface treated glass filament and epoxy resin was measured by the micro-droplet method using an analyzer for evaluation of interfacial properties of composite materials (HM410 by Tohei Sangyo Co., Ltd.). The shear strength τ (MPa) per unit area is given as $\tau=F/\pi DL$ wherein D (μm) is the diameter of a filament, L (μm) is the length of a portion of the filament buried in the resin bead, and F (mN) is the load required to withdraw the resin bead in filament axial direction. Table 2 shows the main component of the surface treating agent and the measurements of shear strength.

TABLE 2

| | Surface treating agent's main component | Shear strength (MPa) |
|---|---|---|
| Example 3 | Product of Example 1 | 37.9 |
| Example 4 | Product of Example 2 | 36.9 |
| Comparative Example 3 | not added (untreated) | 32.7 |
| Comparative Example 4 | X-12-967C | 33.1 |
| Comparative Example 5 | KBM-803 | 33.8 |

X-12-967C: (trimethoxysilyl)propylsuccinic anhydride (Shin-Etsu Chemical Co., Ltd.)
KBM-803: trimethoxysilylpropylmercaptan (Shin-Etsu Chemical Co., Ltd.)

The test results of Examples and Comparative Examples demonstrate that the surface modified with the surface treating agents of the invention is effective for promoting adhesion to epoxy resins, and the efficiency of treatment of glass filaments is improved owing to thorough hydrolysis of reaction products, exerting a satisfactory coupling effect.

Evaluation of Adhesion Between Silver Substrate and Encapsulating Epoxy Resin

Examples 5 and 6 and Comparative Examples 6 to 8

An encapsulating epoxy resin compound having the formulation shown in Table 3 was prepared according to the Example of JP-A 2012-046576. A tablet of the resin compound was integrally molded to a silver substrate (diameter 3.6 mm, thickness 0.5 mm) at 175° C. and 6.9 MPa for 2 minutes to form a frustoconical epoxy resin part (top diameter 3 mm, bottom diameter 3.6 mm, height 3 mm, interface area 10 mm²) on the silver substrate. With the silver substrate fixedly secured, a torque needed to force the epoxy resin part at its side until separation was measured. The results are shown in Table 3.

In Table 3, the amount of the aqueous silane coupling agent composition added is expressed in terms of the amount of its main component, that is, solid content.

TABLE 3

| Formulation (pbw) | Example | | Comparative Example | | |
|---|---|---|---|---|---|
| | 5 | 6 | 6 | 7 | 8 |
| Product of Example 1 | 0.2 | | | | |
| Product of Example 2 | | 0.2 | | | |
| X-12-967C | | | 0.2 | | |
| KBM-803 | | | | 0.2 | |
| Epoxy resin | 5.6 | 5.6 | 5.6 | 5.6 | 5.6 |
| Phenolic resin curing agent | 5.5 | 5.5 | 5.5 | 5.5 | 5.5 |
| Inorganic filler | 88 | 88 | 88 | 88 | 88 |
| Silane coupling agent | 0.1 | 0.1 | 0.1 | 0.1 | 0.1 |
| Cure promoter | 0.2 | 0.2 | 0.2 | 0.2 | 0.2 |
| Parting agent | 0.2 | 0.2 | 0.2 | 0.2 | 0.2 |
| Coloring agent | 0.3 | 0.3 | 0.3 | 0.3 | 0.3 |
| Adhesion to Ag substrate (N) | 15 | 14 | 7 | 11 | 4 |

X-12-967C: (trimethoxysilyl)propylsuccinic anhydride (Shin-Etsu Chemical Co., Ltd.)
KBM-803: trimethoxysilylpropylmercaptan (Shin-Etsu Chemical Co., Ltd.)
Epoxy resin: YX-400K by Mitsubishi Chemical Corp.
Phenolic resin curing agent: MEH-7851SS by Meiwa Plastic Industries, Ltd.
Inorganic filler: spherical fused silica, average particle size 10.8 μm, BET surface area 5.1 m²/g
Silane coupling agent: KBM-573 by Shin-Etsu Chemical Co., Ltd.
Cure promoter: addition product of triphenylphosphine and p-benzoquinone
Parting agent: oxidized polyethylene wax PED 191 by Clariant
Coloring agent: carbon black Carbon #5 by Mitsubishi Chemical Corp.

The results of Examples and Comparative Examples demonstrate that the surface modification by integral blending of the surface treating agent of the invention is effective for improving adhesion to epoxy resin, and the efficiency of treatment of silica and silver substrate is improved owing to thorough hydrolysis, exerting a satisfactory coupling effects.

Japanese Patent Application No. 2014-171359 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An aqueous silane coupling agent composition obtained from cohydrolytic reaction of (i) a succinic anhydride-containing silane coupling agent having the general formula (1) and (ii) a mercapto-containing silane coupling agent having the general formula (2) in a molar ratio of 99:1 to 1:1,

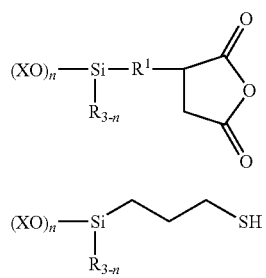

wherein R¹ is a substituted or unsubstituted, saturated, divalent hydrocarbon group of 3 to 12 carbon atoms or substituted or unsubstituted, divalent hydrocarbon group of 3 to 12 carbon atoms having an unsaturated carbon-carbon double bond or triple bond, with the proviso that when R¹ is branched, an aliphatic unsaturated carbon-carbon bond is not present at an end of the branch, and when R¹ is a substituted group, an aliphatic unsaturated carbon-carbon bond is not present at an end of the substituent, R is a monovalent hydrocarbon group of 1 to 10 carbon atoms, n is 2 or 3, and X is a monovalent hydrocarbon group of 1 to 4 carbon atoms.

2. The aqueous silane coupling agent composition of claim 1 which contains volatile components which are detectable by headspace gas chromatography, the content of volatile organic compounds being up to 10% by weight of the volatile components.

3. The aqueous silane coupling agent composition of claim 1 wherein R¹ is propylene.

4. The aqueous silane coupling agent composition of claim 1 wherein hydrolyzates and (co)condensates thereof are obtained from the cohydrolytic reaction of silane coupling agents (i) and (ii) and present in a total amount of 0.5 to 50% by weight of the entire composition.

5. The aqueous silane coupling agent composition of claim 1 which experiences a viscosity buildup of less than 10% when stored at 50° C. for one month.

6. A method for preparing an aqueous silane coupling agent composition according to claim 1, comprising the steps of:

effecting cohydrolytic reaction of (i) a succinic anhydride-containing silane coupling agent having the general formula (1) and (ii) a mercapto-containing silane coupling agent having the general formula (2) in a molar ratio of 99:1 to 1:1, and removing the alcohol generated such that the content of volatile organic compounds is up to 10% by weight of volatile components in the composition which are detectable by headspace gas chromatography,

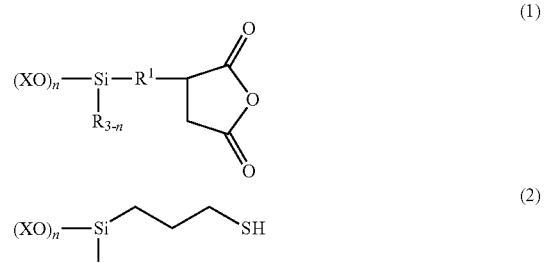

wherein R¹, R, n and X are as defined above.

7. A surface treating agent comprising the aqueous silane coupling agent composition of claim 1.

8. An article comprising a substrate treated with the surface treating agent of claim 7.

9. The article of claim 8 wherein the substrate is a glass fiber member selected from the group consisting of glass cloth, glass tape, glass mat and glass paper.

10. The article of claim 8 wherein the substrate is an inorganic filler.

11. The article of claim 8 wherein the substrate is ceramic or metal.

* * * * *